United States Patent [19]
Gattesco

[11] 4,186,492
[45] Feb. 5, 1980

[54] DIAL MEASUREMENT GAUGE
[75] Inventor: Giovanni Gattesco, Crissier, Switzerland
[73] Assignee: Tesa, S.A., Renens, Switzerland
[21] Appl. No.: 958,114
[22] Filed: Nov. 6, 1978
[30] Foreign Application Priority Data
Nov. 9, 1977 [CH] Switzerland ............ 13634/77
[51] Int. Cl.² ............................................. G01B 5/02
[52] U.S. Cl. ................................................. 33/147 T
[58] Field of Search ............... 33/147 T, 147 R, 125 R
[56] References Cited
U.S. PATENT DOCUMENTS
3,213,543  10/1965  Masuda ........................ 33/147 T
3,447,244  6/1969  Scholl ........................... 33/147 T Primary Examiner—Harry N. Haroian
Attorney, Agent, or Firm—Anthony J. Casella

[57] ABSTRACT

The invention relates to a dial measurement gauge, which comprises a drive rack with a transmission multiplier mechanism connected to a movable pointer of its dial, a depth feeler gauge movable along and opposite the toothing of the rack, and a device for the protection of the said toothing. The gauge is characterized by the fact that the rack is formed by the rigid assembly of two profiled members, one of which comprises the toothing and the other covers the exposed side of the said toothing at least over its entire length and bears, with free sliding motion, against the depth feeler gauge located opposite it.

3 Claims, 2 Drawing Figures

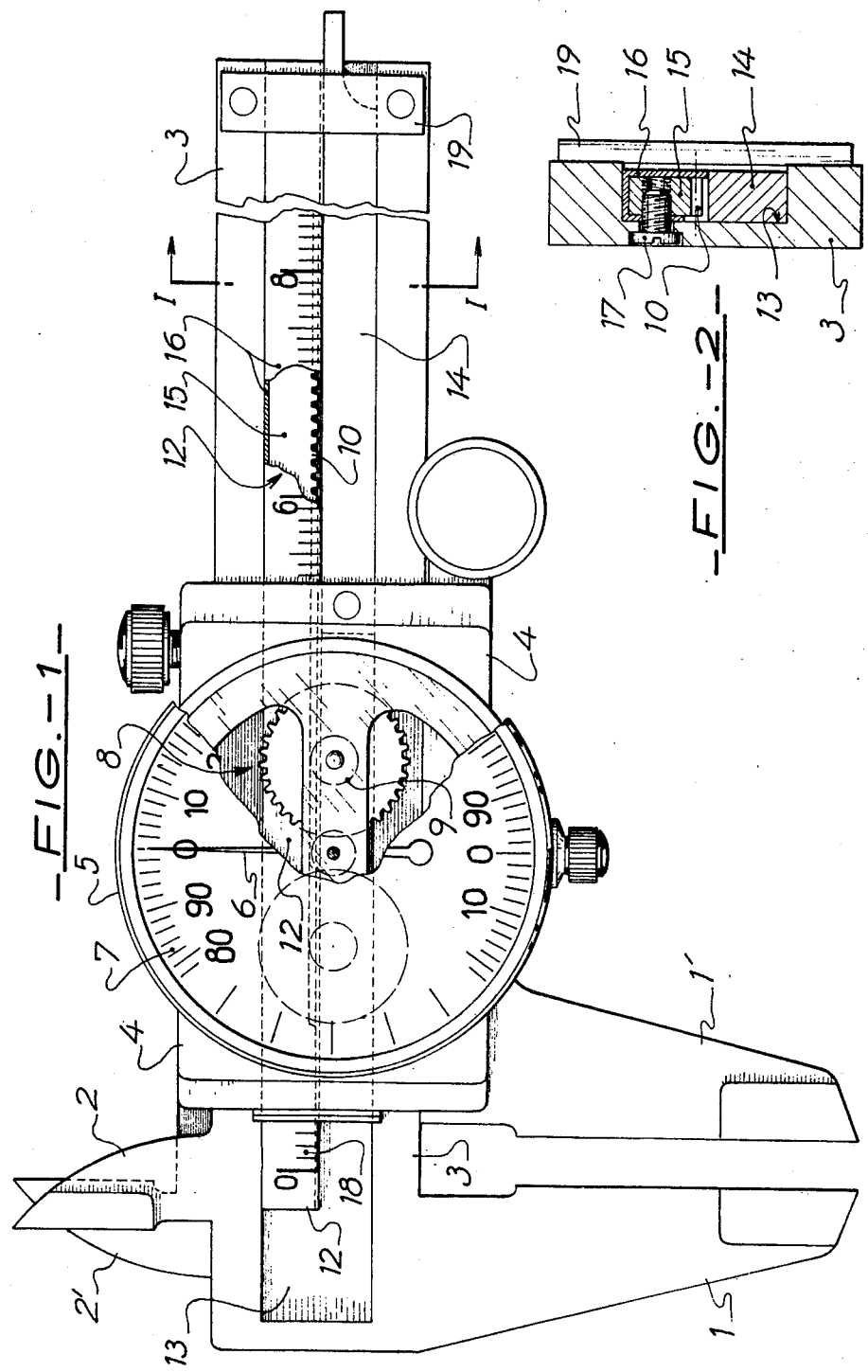

DIAL MEASUREMENT GAUGE

The object of the present invention is a dial measurement gauge comprising a stationary feeler integral with a linear slideway, a rack fastened along the slideway, a movable feeler rigidly connected with a slide block movable along the slideway, a reading dial rigidly connected with the slide block and comprising a movable indicator member, a gear transmission multiplier mechanism fastened to the slide block and in engagement with the rack and driving the indicator member of the reading dial, a linear depth gauge connected to the slide block and movable along the slideway opposite the toothing of the rack, and a device for the protection of said toothing.

Dial measurement gauges are already known which comprise a protection device formed of a flexible strip covering the toothing of the rack and fastened at its two ends to the two ends of the rack.

In order to permit the engaging of the toothing of the rack by the input pinion of the transmission multiplier mechanism, said flexible strip is deviated, at the location of the said pinion, onto a bypass circuit with guide rollers which is arranged in the slide block. This protective device is effective but it is so complicated and its delicate assembly is very expensive and there is a danger of premature wear in case abrasive particles accidentally should penetrate as a result of the relative movement of the strip in the slide block.

Dial measurement gauges are also known in which, for the purpose of economy, the protection device is formed of a rigid linear strip fastened to the feeler gauge or to the slide block and comprising a part which extends above the exposed outer side of the toothing of the rack, but this protective strip, upon following the displacements of the depth feeler gauge and of the slide block to which it is fastened, leaves uncovered the exposed side of the part of the toothing of the rack located between the feelers of the dial gauge.

The dial measurement gauge of the invention is characterized by the fact that it comprises a rack formed of the rigid assembling of two profiled members one of which comprises the toothing while the other covers the exposed side of the said toothing, at least over its entire length and bears with free sliding motion, against the depth feeler gauge located opposite it.

The accompanying drawing shows by way of example one embodiment of the object of the invention.

FIG. 1 is a partial view of the assembly;

FIG. 2 is a crosssection through same on a larger scale, along the axis I—I of FIG. 1.

The gauge shown comprises the customary stationary feeler having two noses 1 and 2 for outside and inside measurements, rigidly connected with a linear slideway 3. On the slideway 3 there is mounted a slide block 4 bearing an ordinary movable feeler, also having two noses 1' and 2' in positions opposite the noses 1 and 2. On the slide block 4 there is fastened the housing of a dial indicator 5 which comprises a movable pointer 6 mounted for rotation over a graduated dial 7.

The angular displacements of the pointer 6 are related to the linear displacements of the slide block 4 by a transmission multiplier mechanism 8 whose input pinion 9 is in engagement with the toothing 10 of a rack 12 fastened in a longitudinal groove 13 which extends along the slideway 3, said mechanism 8 having the effect of amplifying the movements of the pointer 6 with respect to those of the slide block so as to permit the reading, on the graduated dial 7, of sub-multiples of the graduations of the slideway 3.

A depth feeler gauge 14 which is connected to the slide 4 is also mounted in the groove 13, parallel to and facing the toothing 10 of the rack 12.

The rack 12 is formed of a rigid assembly of two profiled parts 15 and 16, which are clearly visible in section in FIG. 2, one of which, the profiled part 15 is of rectangular cross section and comprises the toothing 10 cut on its edge while the other, the profiled member 16, is of U-shaped cross section, one arm thereof covering and slightly protruding beyond the exposed side of the toothing 10 and bearing, with free sliding action, against the depth gauge feeler 14 located opposite the toothing.

The profiled part 15 is fastened rigidly by cementing within the profiled member 16, and the assembly thus established is fastened in the groove 13 of the slideway 3 by uniformly spaced screws 17.

On the visible face of the profiled part 16 there are engraved the graduations 18 of the slideway;

At the end of the slideway 3 there is fastened a stop 19 for the stopping of the slide block 4 and of the depth gauge feeler 14.

The dial measurement gauge of the invention, which is developed in this manner, offers the advantage of good protection of the toothing of the rack from metal chips and other hard particles which might damage it, as well as from possible blows, and does so in an economical manner. Furthermore, the absence of relative movement between the protection element and the toothing of the rack of this gauge has the result that there is no risk of wear by rubbing as in the known gauges which are equipped with a movable protective strip, particularly when this rubbing is aggravated by the possible entrainment of abrasive materials.

The possibility of engraving the visible face of the profiled protection part 16, which has been utilized in the embodiment described, is obviously not indispensable but it makes it possible to avoid the engraving of the slideway itself or the subsequent cementing of an engraved strip thereon.

The connecting of the two profiled members 15 and 16 with each other and with the slideway 3 can be effected in some other manner, for instance entirely by cementing with or without safety screws, or entirely by the threading together of these three parts, as variants of the mixed manner of connection shown in the drawing.

Finally the indicated cross sections of these two profiled parts 15 and 16 are not limitative and may be any desired, provided that the profiled part 16 covers the exposed side of the toothing 10 and bears, with free sliding action, against the depth feeler gauge 14.

What is claimed is:

1. A dial measurement gauge comprising:
   (a) a linear slideway;
   (b) a fixed feeler rigidly connected with said linear slideway;
   (c) a rack formed of a first profiled means comprising a toothing therealong, said rack fastened along the slideway;
   (d) a slide block movable along the slideway;
   (e) a movable feeler, said feeler rigidly connected to the slide block;
   (f) a reading dial rigidly connected to the slide block, said reading dial having a movable pointer;

(g) a gear transmission multiplier mechanism fastened to the slide block, said gear mechanism engaging the rack for controlling the movable pointer of said reading dial;

(h) a linear depth feeler gauge connected to the slide block, said depth feeler gauge movable along the slideway opposite the toothing of the rack; and (i) a second profiled means rigidly assembled to said first profiled rack forming means for covering the exposed side of the toothing thereof over at least its entire length, said second profiled means bearing with free sliding action against said depth feeler gauge.

2. A dial measurement gauge according to claim 1, wherein said second profiled means is U-shaped in cross-section, wherein said first profiled rack forming means is rectangular in cross-section and comprises said toothing cut on its edge, and wherein said first profiled rack forming means is rigidly fastened within said second profiled means.

3. A dial measurement gauge according to claim 1, wherein said second profiled means bears on its outer surface a graduation engraving.

* * * * *